United States Patent
Ha et al.

(10) Patent No.: US 7,844,680 B2
(45) Date of Patent: Nov. 30, 2010

(54) HOME NETWORK SYSTEM

(75) Inventors: Sam-Chul Ha, Changwon-shi (KR);
Seung-Myun Baek, Changwon-shi (KR); Koon-Seok Lee, Changwon-shi (KR); Yong-Tae Kim, Gimhae-shi (KR)

(73) Assignee: LG Electronics Inc., Seoul (KR)

( * ) Notice: Subject to any disclaimer, the term of this patent is extended or adjusted under 35 U.S.C. 154(b) by 672 days.

(21) Appl. No.: 11/597,289

(22) PCT Filed: May 27, 2005

(86) PCT No.: PCT/KR2005/001569

§ 371 (c)(1),
(2), (4) Date: Nov. 27, 2007

(87) PCT Pub. No.: WO2005/115096

PCT Pub. Date: Dec. 8, 2005

(65) Prior Publication Data

US 2008/0140797 A1    Jun. 12, 2008

(30) Foreign Application Priority Data

May 27, 2004    (KR) .................... 10-2004-0037862

(51) Int. Cl.
*G06F 15/16* (2006.01)
(52) U.S. Cl. ...................... 709/208; 709/206
(58) Field of Classification Search ............. 709/208, 709/206
See application file for complete search history.

(56) References Cited

U.S. PATENT DOCUMENTS

2004/0158333 A1 *  8/2004  Ha et al. ................. 700/3

OTHER PUBLICATIONS

"A New Control Protocol for Home Appliances—LnCP", Lee et al., Digital Appliance Research Lab, LG Electronics Inc., 2001.*
Koon-Seok Lee et al.; "A New Control Protocol for Home Appliances-LncP"; published 2001.
Tobe Y. et al., "A lightweight transport protocol for home networks" In; Proceedings of 4$^{th}$ International Workshop on networked appliances, Piscataway, NJ, US: IEEE, Jan. 15-16, 2001, ISBN 0-7803-7259-X, xP 010575050.

* cited by examiner

*Primary Examiner*—George C Neurauter, Jr.
*Assistant Examiner*—Mark D Fearer
(74) *Attorney, Agent, or Firm*—McKenna Long & Aldridge LLP

(57) ABSTRACT

The present invention discloses a home network system using an LnCP. The home network system includes one or more master devices, one or more slave devices, and a network for connecting the master devices to the slave devices on the basis of a predetermined protocol. In the home network system, the master device performs one or plural communication cycles with the plurality of slave devices at the same time at a predetermined time point, and each slave device performs one communication cycle with the master device at the time point.

4 Claims, 7 Drawing Sheets

HOME NETWORK SYSTEM

This application claims priority to International application No. PCT/KR2005/0015690 filed on May 27, 2005, Korean Application No. 10-2004-0037862 filed on May 27, 2004, both of which are incorporated by reference, as if fully set forth herein.

TECHNICAL FIELD

The present invention relates to a home network system, and more particularly to, a home network system using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
| --- | --- | --- |
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system.

DISCLOSURE OF THE INVENTION

The present invention is achieved to solve the above problems. An object of the present invention is to provide a home network system using a control protocol that is a general communication standard for providing functions of controlling and monitoring electric devices in the home network system.

Another object of the present invention is to provide a home network system using a living network control protocol (LnCP) as a general communication standard.

Yet another object of the present invention is to provide a home network system which performs a communication cycle in consideration of an amount of a network traffic and performance of each device.

Yet another object of the present invention is to provide a home network system which improves reliability of data transmission in consideration of an amount of a network traffic.

In order to achieve the above-described objects of the invention, there is provided a home network system including: one or more master devices; one or more slave devices; and a network for connecting the master devices to the slave devices on the basis of a predetermined protocol, wherein the master device performs one or plural communication cycles with the plurality of slave devices at the same time at a predetermined time point, and each slave device performs one communication cycle with the master device at the time point.

Preferably, the communication cycle includes at least one of an one-request one-response communication cycle in which the master device transmits one request packet to the slave device, receives one response packet from the slave device as a response, and ends communication, an one-request multiple-responses communication cycle in which the master device transmits one request packet to the plurality of slave devices, receives one response packet from each slave device, waits for the responses, and ends communication at a maximum reception time, an one-notification communication cycle in which the master device transmits one notification packet to one or plural slave devices, and ends communication, and a repeated notification communication cycle in which the master device repeatedly transmits one notification packet to one or plural slave devices by a predetermined number, and ends communication.

Preferably, in the one-request one-response communication cycle, when the master device does not receive the response packet from the slave device within a predetermined reception time, the master device ends communication.

Preferably, in the one-request multiple-responses communication cycle, the request packet includes a group address.

Preferably, in the one-notification communication cycle and/or the repeated notification communication cycle, the notification packet includes a group address.

Preferably, in the one-notification communication cycle and/or the repeated notification communication cycle, the slave device receiving the notification packet or the master device does not transmit the response packet to the master device transmitting the notification packet or the slave device.

Preferably, the master device and/or the slave device are hybrid devices.

Preferably, the protocol is the LnCP.

BEST MODE FOR CARRYING OUT THE INVENTION

A home network system in accordance with the present invention will now be described in detail with reference to the accompanying drawings.

Figure 1:
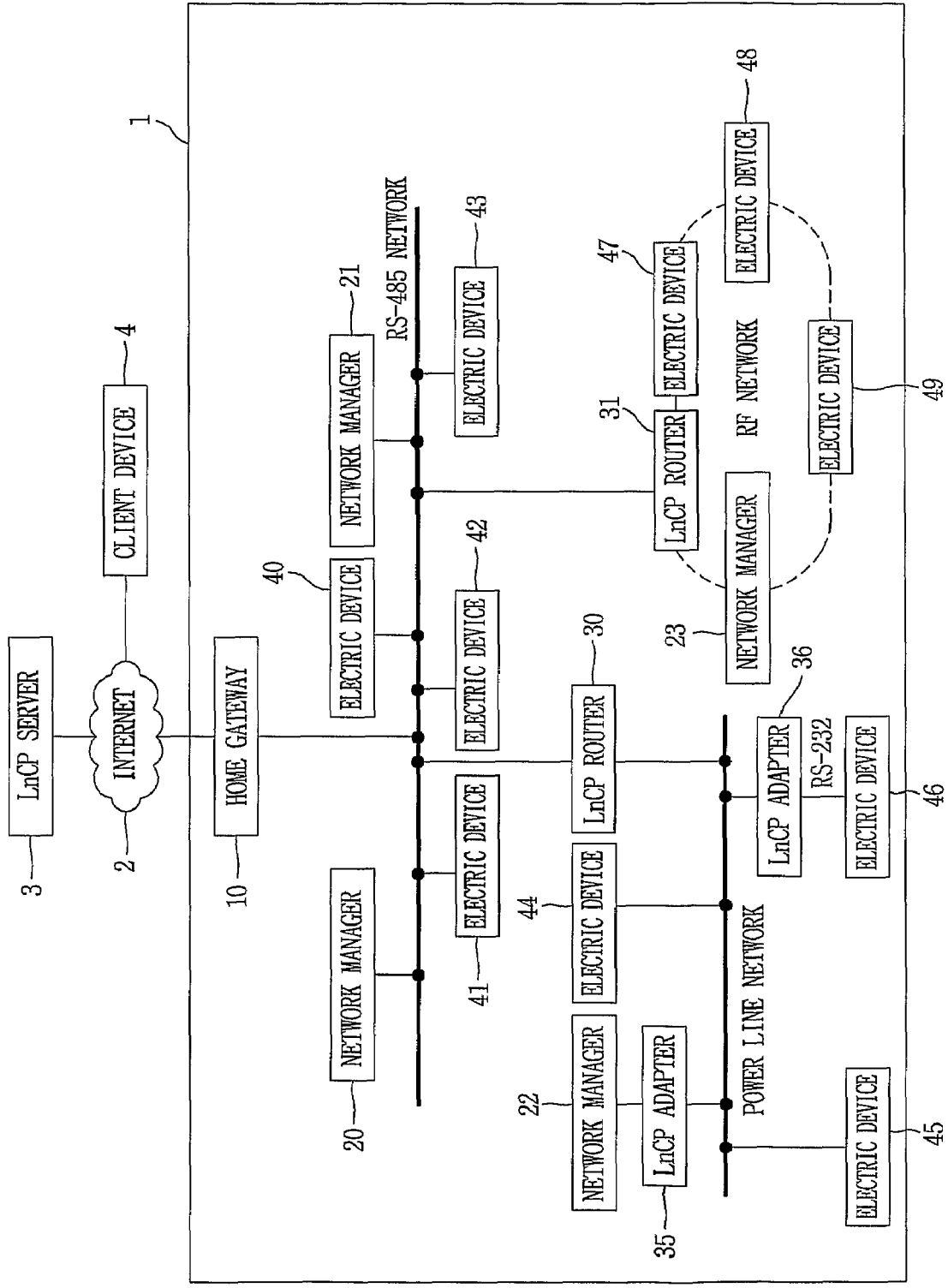
FIG. 1 is a structure view illustrating a home network system to which the present invention is applicable.

FIG. 1 is a structure view illustrating a home network system to which the present invention is applicable.

Referring to FIG. 1, the home network system 1 accesses an LnCP server 3 through an internet 2, and a client device 4 accesses the LnCP server 3 through the internet 3. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of a predetermined type of message. In addition, the LnCP server 3 receives a predetermined type of message from the home network system 1, and stores the message or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical address and/or the product code with 1. Especially, the implicit group address is called a cluster code.

Figure 2:
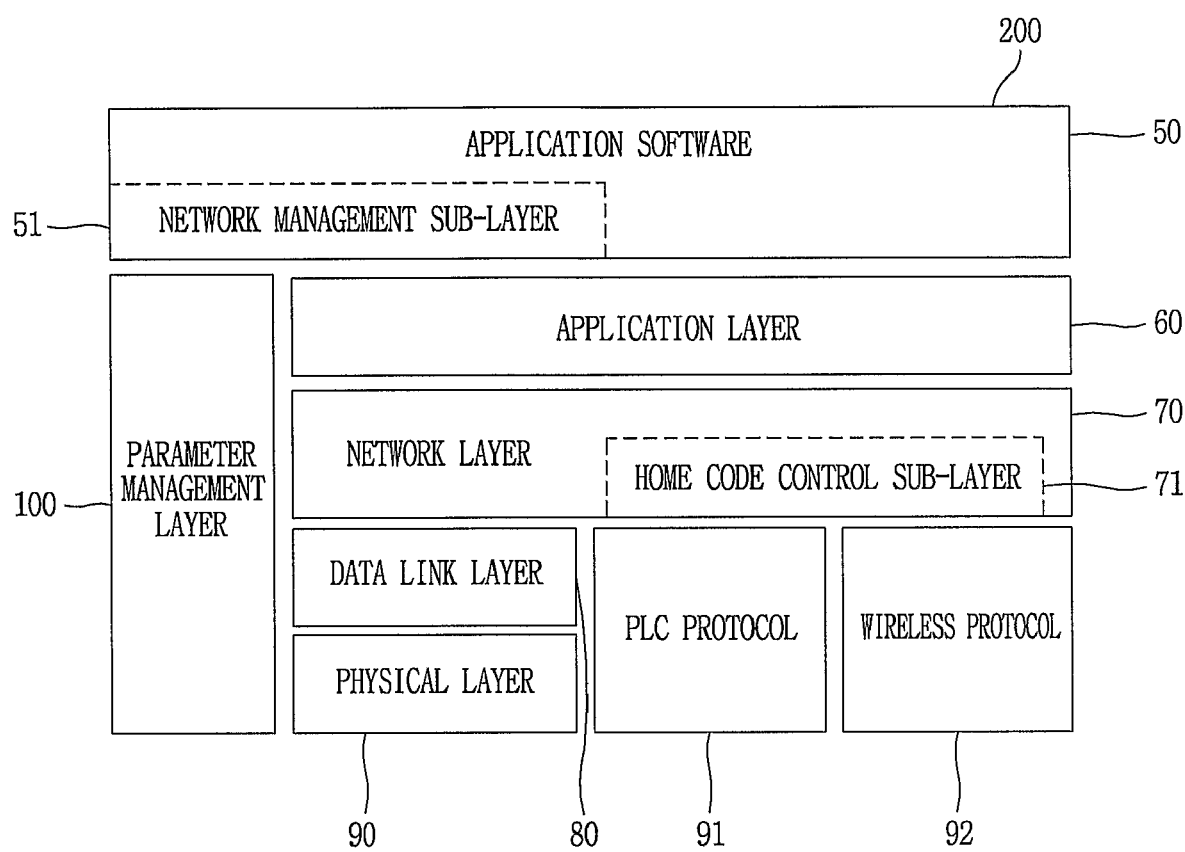
FIG. 2 is a structure view illustrating an LnCP stack in accordance with the present invention.

FIG. 2 is a structure view illustrating an LnCP stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3:
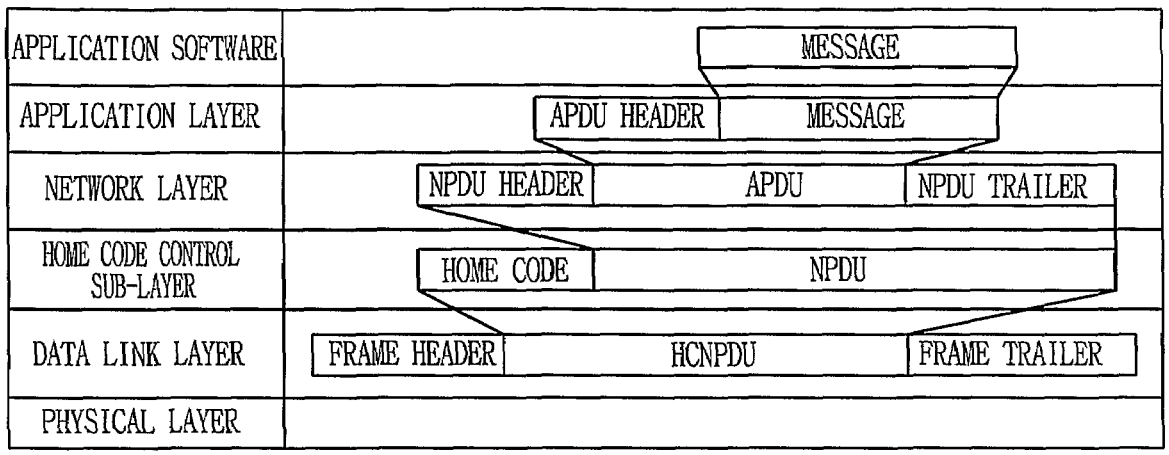
FIGS. 3 and 4 are structure views illustrating interfaces between layers of FIG. 2, respectively.
Figure 4:
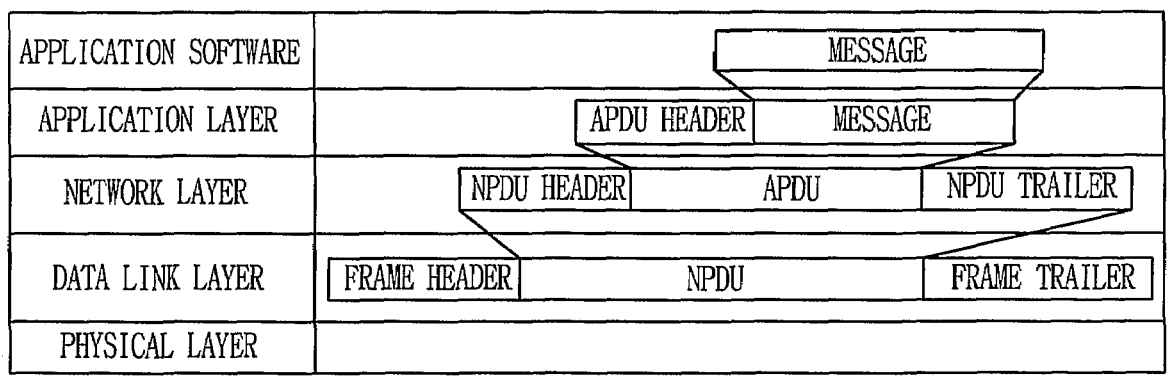

FIGS. 3 and 4 are structure views illustrating interfaces between the layers of FIG. 2, respectively.

FIG. 3 illustrates the interfaces between the layers when the physical layer 90 is connected to the dependent transmission medium, and FIG. 4 illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3a and 3b, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 5 to 10 are detailed structure views illustrating the interfaces of FIGS. 3 and 4, respectively.

Figure 5:
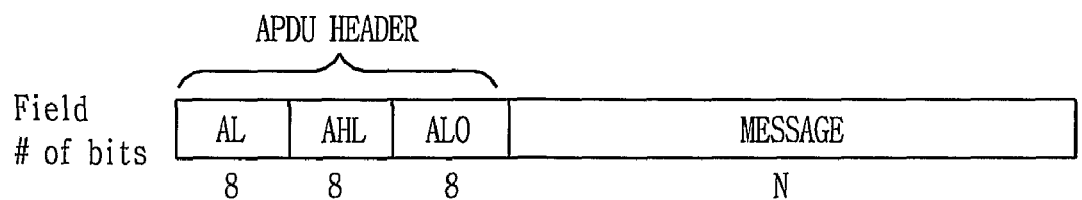
FIGS. 5 to 10 are detailed structure views illustrating the interfaces of FIGS. 3 and 4, respectively.

FIG. 5 illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to AL0), normally has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 6:
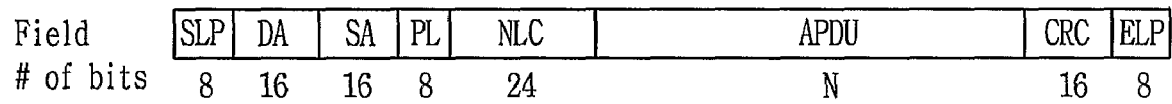
Figure 7:
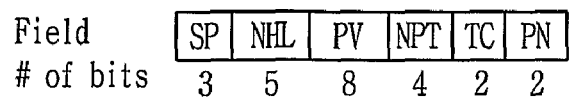

FIG. 6 illustrates the NPDU structure in the network layer 70, and FIG. 7 illustrates a detailed NLC structure of the NPDU.

A start of LnCP packet (SLP) field shows start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind.

A packet length (PL) field shows the whole length of the NPDU, and has a minimum value of 12 bytes and a maximum value of 100 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Application layer |
|---|---|---|
| High | 0 | When an urgent message is transmitted |
| Middle | 1 | When a normal packet is transmitted |
|  |  | When an event message for online or offline status change is transmitted |
| Normal | 2 | When a notification message for composing a network is transmitted |
|  |  | When a normal event message is transmitted |
| Low | 3 | When a data is transmitted by download or upload mechanism |

An NPDU header length (NHL) field extends an NPDU header (NLC field of SLP), normally has 9 bytes, and is extensible maximally to 16 bytes.

A protocol version (PV) field is an one-byte field showing a version of a used protocol. The upper 4 bits include a version field and the lower 4 bits include a sub-version field. The version and the sub-version are represented by the hexadecimal, respectively.

A network layer packet type (NPT) field is a 4-bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Value | Explanation |
|---|---|
| 0 | Request packet |
| 1~3 | Not used |
| 4 | Response packet |
| 5~7 | Not used |
| 8 | Notification packet |
| 9~12 | Not used |
| 13~15 | Reserved value for interface with the home code control sub-layer |

A transmission counter (TC) field is a 2-bit field for retrying a request packet when the request packet or response packet is not successfully transmitted due to a communication error in the network layer 70, or repeatedly transmitting a notification packet to improve a transmission success ratio. A receiver can check a duplicate message by using a value of the TC field. Table 4 shows the range of the values of the TC field by the NPT values.

TABLE 4

| Kind of packet | Value (range) |
| --- | --- |
| Request packet | 1~3 |
| Response packet | 1 |
| Notification packet | 1~3 |

A packet number (PN) field has 2 bits, and is used to check a duplicate packet in a slave device with the TC field and process a plurality of communication cycles in a master device. Table 5 shows the range of the values of the PN field by the NPT values.

TABLE 5

| Kind of packet | Value (range) |
| --- | --- |
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field shows end of a packet and has a value of 0x03. Although a data corresponding to the length of the PL field is received, if the ELP field is not checked, it is deemed to be a packet error.

Figure 8:

FIG. 8 illustrates the HCNPDU structure in the home code control sub-layer 71.

As depicted in FIG. 8, a home code (HC) field is added to the upper portion of the NPDU.

The home code is comprised of 4 bytes, and has a unique value within the line distance where a packet can be transmitted.

Figure 9:
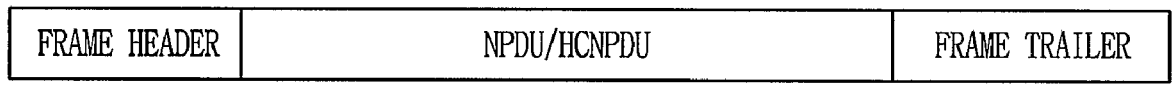

FIG. 9 illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE. 802.11. The data link layer 80 processes the NPDU and the HCNPDU in the same manner.

Figure 10:
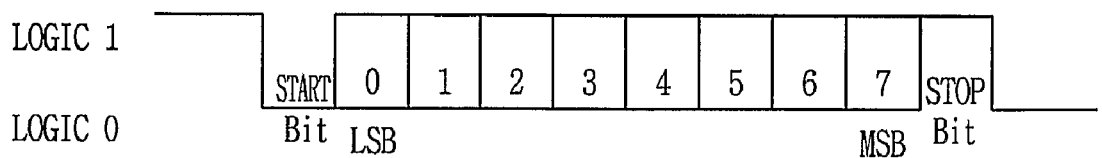

FIG. 10 illustrates a frame structure in the physical layer 90.

The physical layer 90 of the LnCP handles a function of transmitting and receiving a physical signal to a transmission medium. The data link layer 80 can use a non-standardized transmission medium such as RS-485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 10, and transmitted through the transmission medium. The UART frame includes one bit of start bit, 8 bits of data and one bit of stop bit, and does not use a parity bit. The UART frame is transmitted in the order of the start bit to stop bit. When the home network system 1 using the LnCP employs the UART, it does not have additional frame header and frame trailer.

Figure 11:
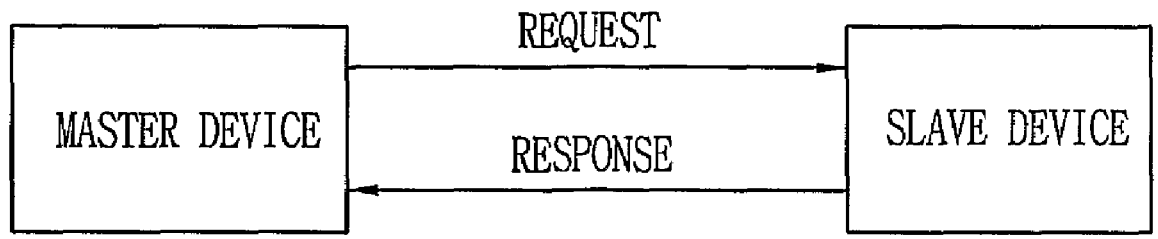
FIGS. 11 and 12 are structure views illustrating a communication cycle in accordance with a first embodiment of the present invention.
Figure 12:
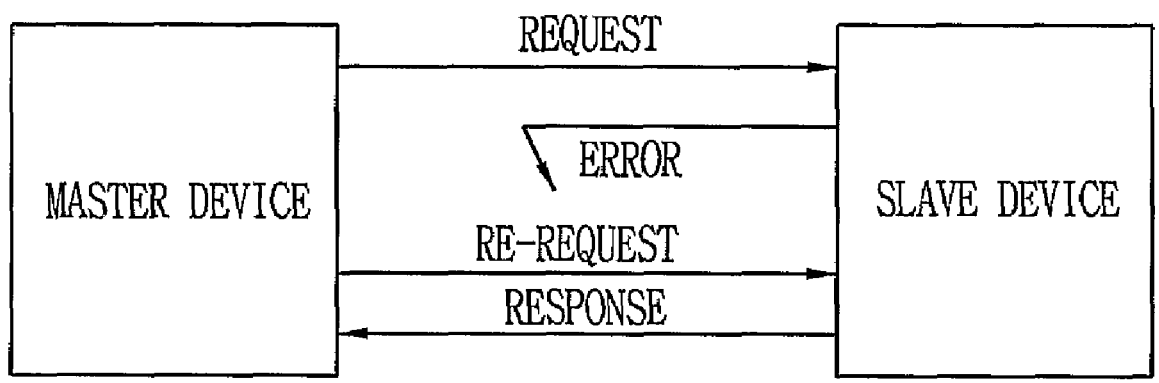

FIGS. 11 and 12 are structure views illustrating a communication cycle in accordance with a first embodiment of the present invention.

As shown in FIG. 11, in an one-request one-response communication cycle, one master device transmits one packet (or data or message) to one slave device, and the slave device receives the packet and transmits one packet to the master device as a response. The master device receives the response packet and ends communication.

In the one-request one-response communication cycle, when the master device does not receive the response packet from the slave device within a predetermined reception time, the master device ends communication.

As depicted in FIG. 12, when an error occurs in the received response packet, the master device transmits one packet for re-request to the slave device.

Figure 13:
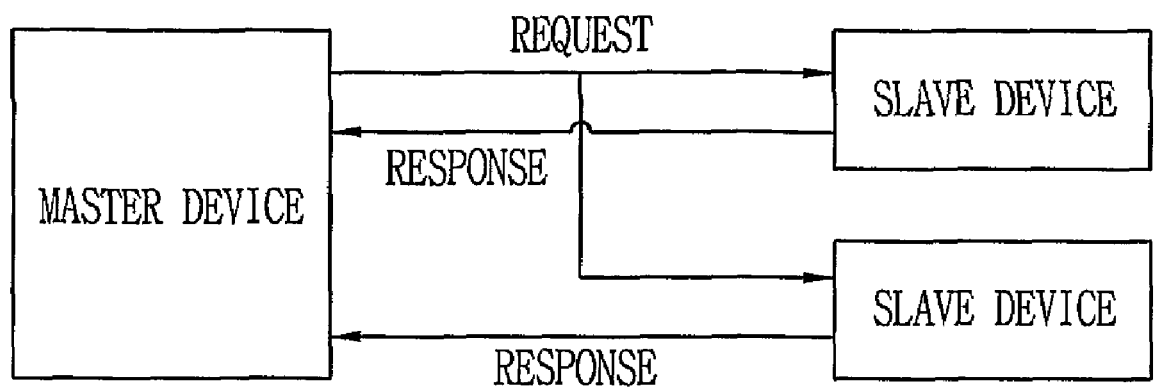
FIG. 13 is a structure view illustrating a communication cycle in accordance with a second embodiment of the present invention.

FIG. 13 is a structure view illustrating a communication cycle in accordance with a second embodiment of the present invention.

Referring to FIG. 13, in an one-request multiple-responses communication cycle, one master device transmits one request packet to the plurality of slave devices, and each slave device receives the request packet and transmits one response packet to the master device as a response. The master device receives the response packets, waits for the responses, and ends communication at a maximum reception time.

In the one-request multiple-responses communication cycle, the request packet includes the group address mentioned above, so that the plurality of slave devices can receive the group address.

In FIGS. 11 to 13, the master device and/or the slave device can be the hybrid devices described above. That is, the master means of the hybrid device generates a predetermined request packet, and transmits the generated packet to the slave device or the slave means of another hybrid device.

Figure 14:
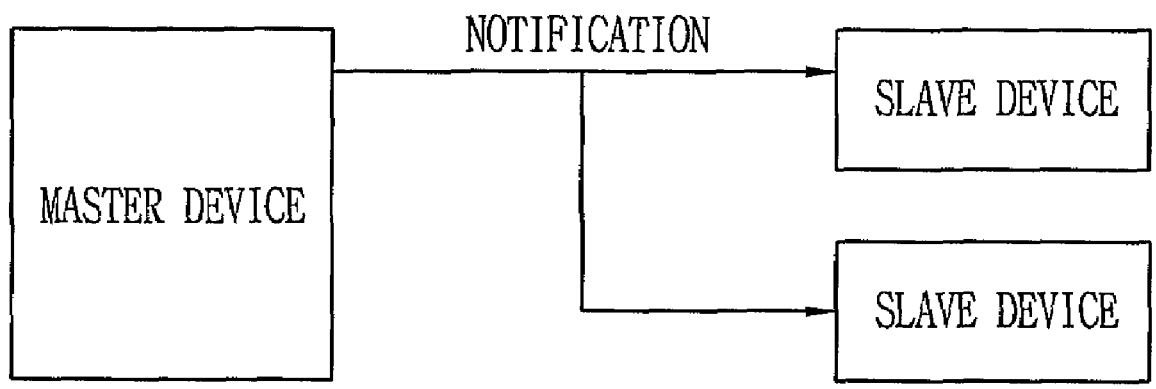
FIG. 14 is a structure view illustrating a communication cycle in accordance with a third embodiment of the present invention.

FIG. 14 is a structure view illustrating a communication cycle in accordance with a third embodiment of the present invention.

As shown in FIG. 14, in an one-notification communication cycle, one master device transmits one notification packet to one or plural slave devices, and ends communication.

As another example, in an repeated notification communication cycle, one master device repeatedly transmits one notification packet to one or plural slave devices by a predetermined number, and ends communication. The repeated notification communication cycle more improves transmission reliability than the one-notification communication cycle.

In the one-notification communication cycle and/or the repeated notification communication cycle, the slave device receiving the notification packet does not transmit the response packet to the master device transmitting the notification packet.

Here, the master device and/or the slave device of FIG. 14 can be the hybrid devices. That is, the master means of the hybrid device generates a notification packet, and transmits the generated packet to the slave device or the slave means of another hybrid device.

In the one-notification communication cycle and/or the repeated notification communication cycle, the notification packet includes the group address described above, so that one or plural slave devices can receive the group address.

As described above, the slave device performs one communication cycle with one master device at a given time point. That is, while one slave device performs one communication cycle, the master device communicating with the slave device does not generate and transmit an additional packet, and the slave device does not receive a packet based on another communication cycle performed by another master device. Conversely, the master device can perform the plurality of communication cycles with the plurality of slave devices at a given time point. However, while the master device performs a predetermined communication cycle with the slave device (namely, before ending the communication cycle), the master device does not communicate with the slave device by an additional communication cycle. Therefore, the master device controls the amount of the network traffic by preventing packets or data from being excessively transmitted to the slave device. In addition, while the slave device performs one communication cycle, the slave device does not receive another packet or data, thereby efficiently processing the current packet or data.

As discussed earlier, each slave device of FIGS. 11 to 14 performs one communication cycle with one master device, and the master device performs one or plural communication cycles with one or plural slave devices. For example, the master device can communicate with two slave devices by the one-request one-response communication cycle, one slave device by the one-request one-response communication cycle, and the plurality of slave devices by the one-request multiple-responses communication cycle, the one-notification communication cycle or the repeated notification communication cycle. Here, each slave device communicates with one master device only by one communication cycle.

The present invention provides the home network system using the control protocol that is the general communication standard for providing functions of controlling and monitoring the electric devices in the home network system.

The present invention provides the home network system using the LnCP as a general communication standard.

The present invention provides the home network system which optimizes the amount of the network traffic and the performance of each device by a predetermined communication cycle.

The present invention provides the home network system which improves reliability of data transmission in consideration of the amount of the network traffic.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method for communicating with a slave device according to the predetermined protocol, the method performed by a master device and the method comprising:

performing a generating operation for generating a message to be transmitted to the slave device, according to the predetermined protocol comprising an application layer, a network layer, a data link layer and a physical layer, wherein the master device controls the slave device or monitors a status of the slave device and the slave device responds to a message of the master device and notifies a change of the slave device, wherein the physical layer further comprises a special protocol for providing an interface with a dependent transmission medium, and the predetermined protocol further comprises a home code control sub-layer for setting, managing and processing a home code for network security when the master device and the slave device are connected via the dependent transmission medium, wherein the generating operation comprises transmitting an application layer protocol data unit (APDU) from the application layer to the network layer, transmitting a network layer protocol data unit (NPDU) from the network layer to a home code control sub-layer, when the physical layer is connected to the dependent transmission medium, wherein the NPDU is generated in the network layer, the NPDU comprising an NPDU header and the APDU, wherein the NPDU header comprises a network layer control (NLC) field, wherein the NLC field comprises a network layer packet type (NPT) field and a transmission counter (TC) field, wherein the NPT field is set as one of a first code for specifying a request packet, a second code for specifying a response packet, and a third code for specifying a notification packet, wherein a value of the TC field is set based on the NPT field, wherein when the NPT field is set as the first code or the third code, the value of the TC field is set in a range of 1 to 3, and when the NPT field is set as the second code, the value of the TC field is set as 1, transmitting a home code control sub-layer protocol data unit (HCNPDU) from the home code control sub-layer to the data link layer, wherein the home code control sub-layer protocol data unit (HCNPDU) is obtained by adding a home code field including the home code to the network layer protocol data unit (NPDU), and transmitting a data frame unit based on the HCNPDU from the data link layer to the physical layer;

transmitting, via the dependent transmission medium to the slave device, the generated message including the NPT field set as the first code and the TC field set as 1; and in case that an error occurs by a response in response to the generated message, re-transmitting, via the dependent transmission medium, the generated message including the NPT field set as the first code and the TC field set as 2, the response including the NPT field set as the second code and the TC field set as 1, wherein when the slave device receives the generated message from the master device, the slave device ignores another message received from another master device until the response is transmitted to the master device.

2. The method of claim 1, wherein the NLC field further comprises a start indicating field for indicating the start of a packet.

3. A master device for communicating a message with a slave device, the master device comprising:

a physical interface connected to a dependent transmission medium and configured to transmit/receive a message; and a processor configured to:

perform a generating operation for generating a message to be transmitted to the slave device, according to the predetermined protocol comprising an application layer, a network layer, a data link layer and a physical layer, wherein the master device controls the slave device or monitors a status of the slave device and the slave device responds to a message of the master device and notifies a change of the slave device, wherein the physical layer further comprises a special protocol for providing an interface with the dependent transmission medium, and the predetermined protocol further comprises a home code control sub-layer for setting, managing and processing a home code for network security, wherein the generating operation comprises transmitting an application layer protocol data unit (APDU) from the application layer to the network layer, transmitting a network layer protocol data unit (NPDU) from the network layer to a home code control sub-layer, wherein the NPDU is generated in the network layer, the NPDU comprising an NPDU header and the APDU, wherein the NPDU header comprises a network layer control (NLC) field, wherein the NLC field comprises a network layer packet type (NPT) field and a transmission counter (TC) field, wherein the NPT field is set as one of a first code for specifying a request packet, a second code for specifying a response packet, and a third code for specifying a notification packet, wherein a value of the TC field is set based on the NPT field, wherein when the NPT field is set as the first code or the third code, the value of the TC field is set in a range of 1 to 3, and when the NPT field is set as the second code, the value of the TC field is set as 1, transmitting a home code control sub-layer protocol data unit (HCNPDU) from the home code control sub-layer to the data link layer, wherein the home code control sub-layer protocol data unit (HCNPDU) is obtained by adding a home code field including the home code to the network layer protocol data unit (NPDU), and transmitting a data frame unit based on the HCNPDU from the data link layer to the physical layer, transmit, via the physical interface to the slave device, the generated message including the NPT field set as the first code and the TC field set as 1, and in case that an error occurs by a response in response to the generated message, re-transmit, via the dependent transmission medium, the generated message including the NPT field set as the first code and the TC field set as 2, the response including the NPT field set as the second code and the TC field set as 1, wherein when the slave device receives the generated message from the master device, the slave device ignores another message received from another master device until the response is transmitted to the master device.

4. The master device of claim 3, wherein the NLC field further comprises a start indicating field for indicating the start of a packet.

* * * * *